(12) United States Patent
Hansen

(10) Patent No.: US 11,022,175 B2
(45) Date of Patent: Jun. 1, 2021

(54) SEAL

(71) Applicant: Siemens Gamesa Renewable Energy A/S, Brande (DK)

(72) Inventor: Mathias Muff Hansen, Esbjerg V (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/484,181

(22) PCT Filed: Nov. 10, 2017

(86) PCT No.: PCT/EP2017/078827
§ 371 (c)(1),
(2) Date: Aug. 7, 2019

(87) PCT Pub. No.: WO2018/145785
PCT Pub. Date: Aug. 16, 2018

(65) Prior Publication Data
US 2020/0025242 A1    Jan. 23, 2020

(30) Foreign Application Priority Data

Feb. 9, 2017 (DE) .................... 10 2017 202 087.3

(51) Int. Cl.
*F16C 33/78*      (2006.01)
*F16J 15/32*      (2016.01)
(Continued)

(52) U.S. Cl.
CPC .......... *F16C 33/7823* (2013.01); *F16J 15/164* (2013.01); *F16J 15/3244* (2013.01);
(Continued)

(58) Field of Classification Search
CPC .... F16C 33/782; F16C 33/7823; F16C 19/34; F16C 33/7806; F16C 33/7853;
(Continued)

(56) References Cited

U.S. PATENT DOCUMENTS 1,636,027 A * 7/1927 Walter ........................ F16J 9/20
277/464
3,851,889 A * 12/1974 Nisper ........................ F16J 9/20
277/461
(Continued)

FOREIGN PATENT DOCUMENTS

CN      2178811 Y       10/1994
DE      102013003401 A1  8/2014
(Continued)

OTHER PUBLICATIONS

International Search Report dated Feb. 23, 2018 for Application No. PCT/EP2017/078827.
(Continued)

*Primary Examiner* — Alan B Waits
(74) *Attorney, Agent, or Firm* — Schmeiser, Olsen & Watts LLP

(57) ABSTRACT

Provided is a seal for a bearing arrangement for sealing an interior space between at least two parts of the bearing arrangement rotatable relatively to each other, and in which the interior space contains a lubricant, whereby the seal includes a seal part which is shaped for conveying the lubricant with a direction component pointing into the interior space.

10 Claims, 5 Drawing Sheets

(51) Int. Cl.
*F16J 15/16* (2006.01)
*F16J 15/3244* (2016.01)
*F16J 15/3272* (2016.01)
*F16C 19/34* (2006.01)

(52) U.S. Cl.
CPC ............ *F16J 15/3272* (2013.01); *F16C 19/34* (2013.01); *F16C 33/7806* (2013.01); *F16C 33/7853* (2013.01); *F16C 2300/14* (2013.01); *F16C 2360/31* (2013.01)

(58) Field of Classification Search
CPC ............... F16C 2300/14; F16C 2360/31; F16J 15/3272; F16J 15/164; F16J 15/3244
See application file for complete search history.

(56) References Cited

U.S. PATENT DOCUMENTS

| | | | |
|---|---|---|---|
| 4,427,205 A | 1/1984 | Holzer et al. | |
| 4,610,319 A * | 9/1986 | Kalsi | E21B 10/24 175/371 |
| 5,836,700 A * | 11/1998 | Wilkie, Jr. | F16C 33/76 384/480 |
| 8,550,467 B2 * | 10/2013 | Dietle | F16J 15/164 277/559 |
| 9,157,477 B2 * | 10/2015 | Chang | F16C 33/106 |
| 2001/0045704 A1 | 11/2001 | Kalsi | |
| 2005/0156384 A1 | 7/2005 | Toth | |
| 2009/0001671 A1 | 1/2009 | Dietle et al. | |
| 2010/0133757 A1 * | 6/2010 | Maeda | F16J 15/3208 277/436 |
| 2010/0201077 A1 | 8/2010 | Uhrner et al. | |
| 2012/0061921 A1 | 3/2012 | Maskaliunas | |
| 2014/0010655 A1 | 1/2014 | Hofmann | |
| 2014/0265144 A1 | 9/2014 | Crowder, Jr. | |

FOREIGN PATENT DOCUMENTS

| | | |
|---|---|---|
| EP | 0082239 A1 | 6/1983 |
| GB | 2452843 A | 3/2009 |

OTHER PUBLICATIONS

Non-English Chinese Office Action dated Mar. 12, 2020 for Application No. 201780086160.4.

EP Communication pursuant to Article 94(3) EPC dated Dec. 9, 2020 for Application No. 17 808 011 .5.

* cited by examiner

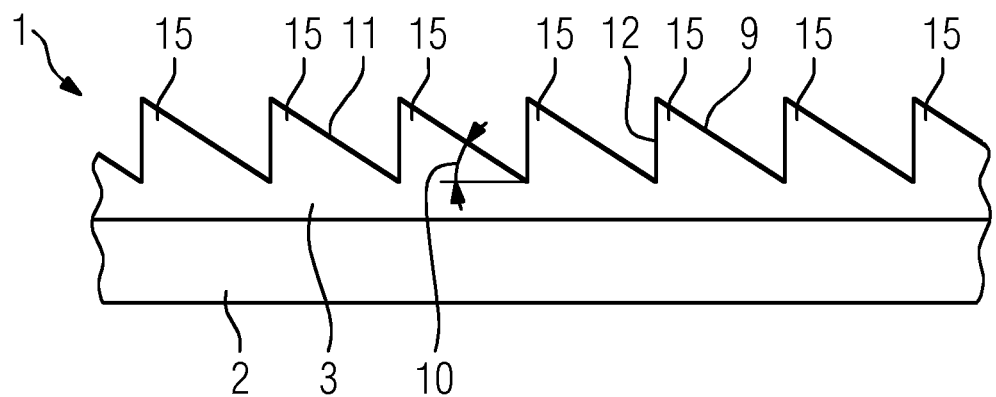
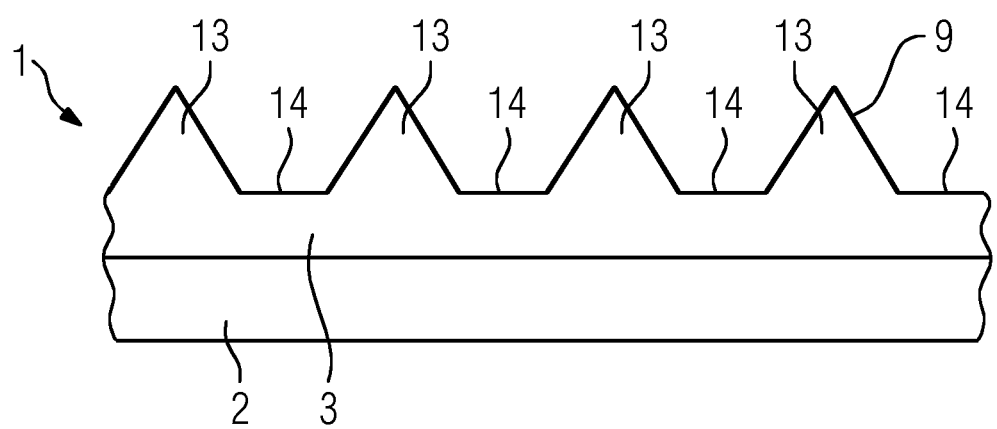
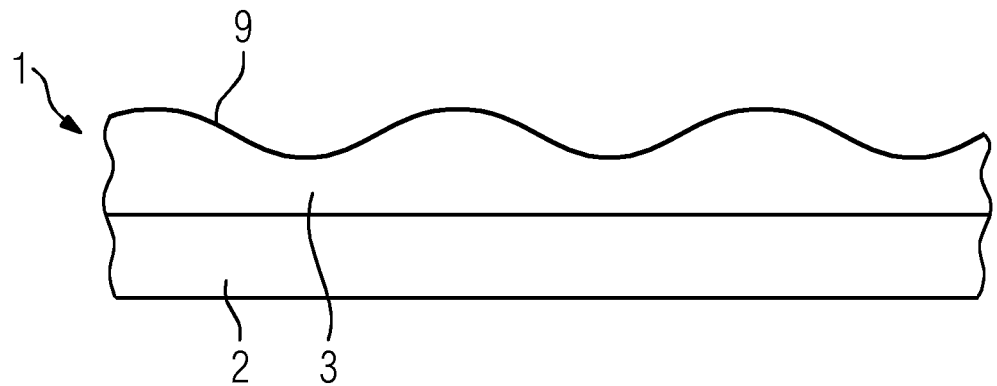

SEAL

CROSS-REFERENCE TO RELATED APPLICATIONS

This application claims priority to PCT Application No. PCT/EP2017/078827, having a filing date of Nov. 10, 2017, which is based on German Application No. 10 2017 202 087.3, having a filing date of Feb. 9, 2017, the entire contents both of which are hereby incorporated by reference.

FIELD OF TECHNOLOGY

The following relates to a seal for a bearing arrangement for sealing an interior space between at least two parts of the bearing arrangement rotatable relatively to each other, in which the interior space contains a lubricant.

BACKGROUND

Unintended lubricant leakages, as they occur for instance in grease lubricated bearings of wind turbines, should be avoided because they require frequent maintenance and cause a loss of power production during the maintenance procedure. To counteract these leakages, seals are used between stationary and moving parts of the bearing. Main bearings in modem wind turbine generators are sealed with standard rubber lip seals originally designed for smaller and oil lubricated applications. However, it has shown that the seal design is not appropriate for large size grease lubricated applications, as during operation, the bearing arrangement of a wind turbine is subject to high axial and radial loads, which make the bearing subject to deformation, especially between the stationary and the rotating parts of the bearing. Thus, the standard rubber lip seals are not able to keep the bearing tight under load situations.

SUMMARY

An aspect relates to an improved seal for a bearing arrangement, which minimizes unintended leakages of lubricant.

The solution according to embodiments of the invention is that the seal comprises a seal part which is shaped for conveying the lubricant with a direction component pointing into the interior space.

The advantage of the solution according to embodiments of the invention is that lubricant, like for instant grease, which comes in contact with the seal is moved away from the sealing area back to the inside of the bearing, so that it cannot escape the bearing.

The leakage of the lubricant is therefore prevented by the seal. For conveying the lubricant with a direction component pointing into the interior space, the seal is making use of the relative rotational movement between the two rotatable parts of the bearing. The seal is fixed at the rotating part but could also be fixed at the stationary part as well. Also, in an arrangement, where both parts of the bearing are moving, the seal part can be fixed on either of the moving parts.

Typical embodiments of the invention may incorporate that the seal part comprises an edge with a lubricant-guiding edge profile, which is a periodically repeated pattern. The periodically repeated pattern forms the shape of the seal part, which causes the shifting of the lubricant towards the interior space of the bearing. Such a pattern consists of a certain geometrical shape that is repeated in circumferential direction of the seal part. Each geometrical shape is designed to shift the lubricant back in the interior space. The periodic repetition of the geometrical shape along the entire extent of the seal part ensures the lubricant guiding functionality for the entire seal and for the entire sealing area The periodically repeated pattern is a saw-tooth profile or a pattern consisting of spaced triangles or a sinusoidal profile or a superposition thereof. By a saw-tooth profile, which is a periodic sequence of right-angled triangles, or by the usage of spaced triangles of arbitrary shape, including right-angled triangles or isosceles triangles, the lubricant guiding functionality of the seal is obtained from the edges of the triangles that are oriented in a forward direction according to the relative movement of the seal. These edges are orthogonal to the movement direction but oriented in a way that they enable a deflection of the lubricant towards the interior space. The triangles can be arranged as a saw-tooth profile without gaps between the triangles or they can be spaced, so that there is a gap between two triangles where the lubricant is not deflected towards the interior of the bearing. Depending on the orientation of the triangles and especially when using either isosceles or equilateral triangles, the functionality of the seal is obtained for both circumferential rotation directions or, with respect to the seal part, in forward and backward direction, respectively. Beside triangles, also a sinusoidal profile or a superposition of sinusoidal profiles and/or saw-tooth profiles and/or patterns consisting of spaced triangles can be used as lubricant guiding edge profile of the seal part. The size of the triangles, or the length of their edges, respectively, as well as the number of triangles on a seal part and/or the distance of their spacing, can be chosen in dependence of the size of the bearing arrangement, the size of the seal, and/or the type of the utilized lubricant.

Embodiments of the invention may incorporate that the seal part is one-piece or consists of two or more segments, which are connectable to each other. The seal part can be fabricated in a ring shape or as a strip-shaped segment, which is connected to itself to form a ring, or the seal part could consist of several strip-shaped segments, which are connected together to form a ring. Seal parts consisting of one or more connectable segments may facilitate the installation of the seal as the seal can be assembled piece by piece. A connection between the segments can occur for instance using a positive connection like a dovetail joint. The lubricant guiding edge profile of the connected segment or each segment of a plurality of connected segments can be provided in a way that the seal consisting of one or more segments possesses an edge profile with a constant periodicity.

It may be provided that the seal comprises a seal body connected to the seal part. The seal body can be used as a contact point to mount the seal in the bearing arrangement. Therefore, it may be advantageous to fix the seal body and the seal part permanently to each other. When using a segmented seal part, also a segmented seal body can be used and fixed to each segment of a segmented seal part. In this case, the segments of the seal body can be connected to each other as well, for instance by a positive connection like a dovetail joint. Alternatively, the seal body can be one-part and may be attached to a ring of already connected seal part segments.

A connection between seal body and seal part can be established in such way that the seal body is glued to the seal part. A glued connection establishes a permanent fixture of the seal body to the seal part and facilitates the assembly of the entire seal.

For a seal consisting of a seal body and a seal part, it may be provided that the edge of the seal part protrudes the seal body. The protrusion of the seal part is so that the structures of the lubricant guiding edge profile are not covered by the seal body and protrude it entirely to not hamper their lubricant guiding function and to enable contact of the entire structure of the edge profile of the seal part and the lubricant in a mounted state of the seal.

Typical embodiments of the invention may comprise that the seal body consists of an elastic and compressible material. For attaching the seal to the bearing, the seal body can be compressed between two or more components of a bearing arrangement using appropriate fixing devices, like for instance screws. The usage of an elastic and compressible material for a seal body enables a fixation of the seal by seal body compression.

A seal body consisting of an elastic and compressible material consists of rubber, cellular rubber or foamed polymer. These materials possess the elastic and compressible properties, which are required for fixing a mounted seal by compression of the seal body. Cellular rubber or foamed polymer exhibit a porosity that is small enough to prevent a permeation of water from the outside into the bearing interior.

It may be provided that the seal part consists of a polymer material, polytetrafluoroethylene (PTFE). During operation of a seal fixed in a bearing, the seal part is in a sliding contact with at least one part of the bearing. The usage of a material like PTFE results in a low friction between the bearing and the seal part and reduces therefore both the wear of the seal and the dissipated heat of the bearing arrangement.

A further embodiment of a wind turbine according to embodiments of the invention may provide that the bearing comprises a seal according to embodiments of the invention exhibiting one or more of the discussed features. Hereby, a respective bearing arrangement can be formed by the rotor of the wind turbine and a stationary structure of the wind turbine, which are connected by a bearing, for instance a rolling element bearing, which is sealed by a seal according to embodiments of the invention.

BRIEF DESCRIPTION

Some of the embodiments will be described in detail, with references to the following Figures, wherein like designations denote like members, wherein:

FIG. 2 shows a top view of an embodiment of a seal according to embodiments of the invention;

FIG. 3 shows a top view of an alternative embodiment of a seal according to embodiments of the invention;

FIG. 4 shows a top view of another alternative embodiment of a seal according to embodiments of the invention;

DETAILED DESCRIPTION

Figure 1:
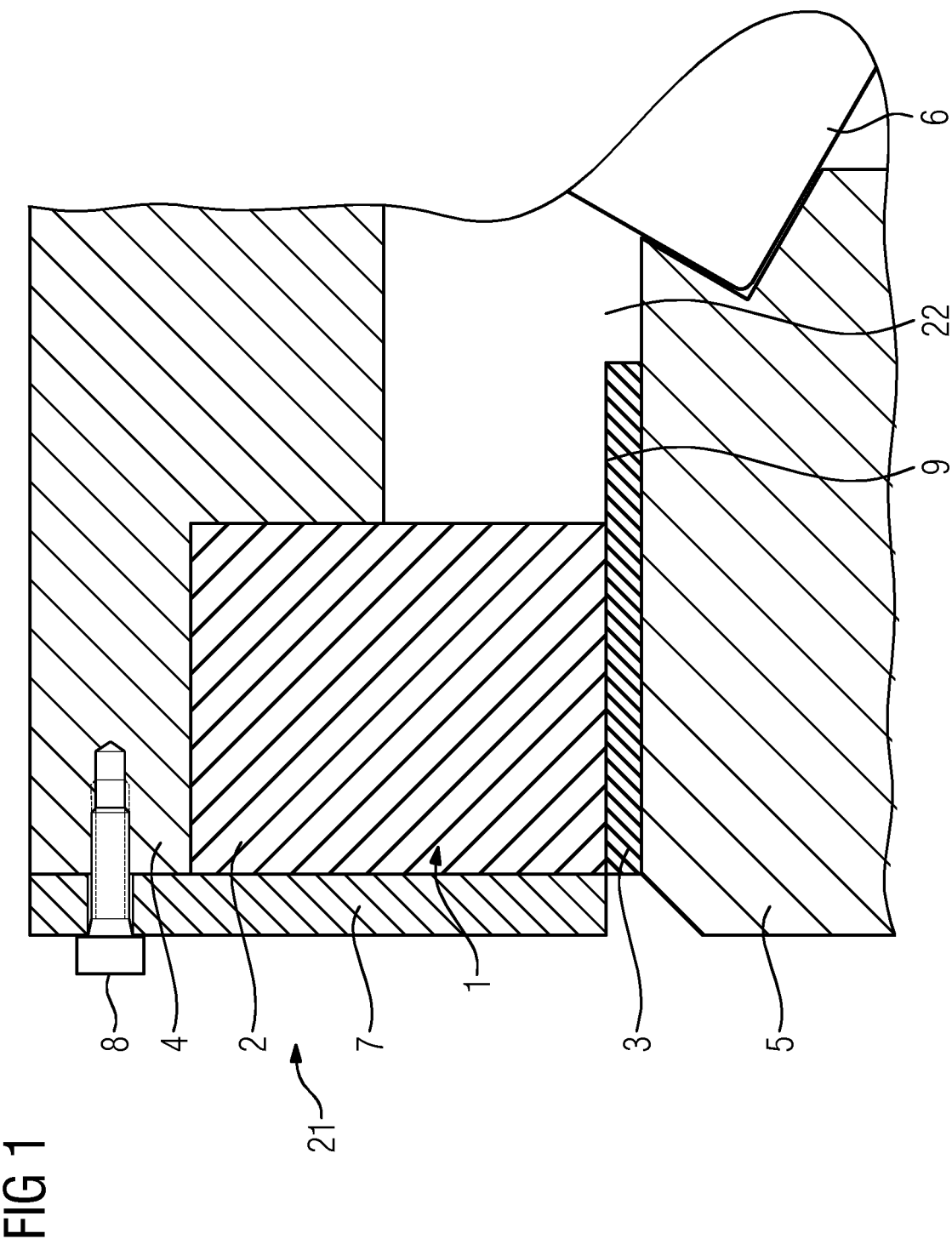
FIG. 1 shows a sectional side view of a bearing arrangement of a wind turbine comprising a seal according to embodiments of the invention.

In FIG. 1, a sectional view of a bearing arrangement 21 is shown, in which the bearing arrangement 21 comprises an embodiment of a seal 1 consisting of a seal body 2 and a seal part 3. The bearing arrangement 21 incorporates a rotatable outer ring 4 and a stationary inner ring 5 rotatably mounted by roller 6. The outer ring 4, the inner ring 5, and the roller 6 surround an interior space 22 containing a lubricant like for instance grease. The seal 1 is fixed in between the outer ring 4 and the plate 7 by compression of the seal body 2. The plate 7 is fixed to the outer ring 4 by a screw 8. The seal part 3 of the seal 1 comprises a lubricant-guiding edge profile 9 oriented towards the interior space 22. The depicted bearing arrangement is rotationally symmetric with the outer ring 4, plate 7, screw 8, and seal 1 rotating around the inner ring 5 and the roller 6. This rotational movement of the seal 1, in particular the movement of the lubricant guiding edge profile 9 composed by the seal part 3 causes a conveying of the grease towards the interior space 22.

FIG. 2 shows a top view on a first embodiment of a seal 1. The seal 1 comprises a seal body 2 and a seal part 3. In this embodiment, the lubricant guiding edge profile 9 is a saw-tooth profile, which is formed by a periodical repetition of right-angled triangles 15. Each of the right-angled triangles 15 comprises a tip angle 10, an edge in forward direction 11, and an edge in backward direction 12. Forward and backward direction refer to the movement direction of the seal 1. For an application in a wind turbine, a range for the tip angle is 15° to 45°, the range of the dimension of the edge in forward direction is between 5 mm and 30 mm and for the edge in backward direction between 2 mm to 10 mm. The seal body 2 has a thickness in between 20 mm and 40 mm and a height extending in the plane of projection of also 20 mm to 40 mm and consists of an elastic and compressible material, rubber, cellular rubber or foamed polymer. The seal part consists of a polymer material, PTFE and has a thickness in the plane of projection between 1 mm and 3 mm. The usage of PTFE for the seal part 3 causes in an arrangement like shown in FIG. 1 low friction between the seal part 3 and the inner ring 5 during operation of the bearing arrangement 21. The seal 1 is installed in such way, that there is no gap or only a small gap between seal part 3 and the inner ring 5. Grease or other lubricant that comes in contact with an edge in forward direction 11 of the depicted saw-tooth profile is shifted towards the interior space 22 of the bearing arrangement 21. While moving constantly during operation, the seal 1 constantly conveys grease or other lubricant, which is going to leak from the bearing, back towards the interior space 22 and minimizes therefore the amount of leaked lubricant. The entire saw-tooth profile of the lubricant-guiding edge profile 9 is protruding the seal body 2, so that the tips in forward direction of the right-angled triangles 15 are not covered by the seal body 2.

Alternative embodiments of the invention are depicted in FIG. 3. The seal 1 consists of a seal body 2 and a seal part 3 exhibiting a lubricant guiding edge profile 9 consisting of separated triangles 13. In this embodiment, the triangles 13 of the lubricant-guiding edge profile 9 are separated by intermediate sections 14. The lubricant guiding functionality of the seal part is obtained only by the edges of the triangles 13 that point towards the interior space of the bearing and not by the intermediate sections 14. As the triangles 13 of this embodiment are isosceles triangles, the lubricant guiding functionality of the seal 1 is provided in both directions of circumferential rotational movement. Alternatively, the edge profile 9 can contain also other types of triangles or other geometric shapes that are repeated periodically either with the intermediate sections 14 or without.

Figure 9:
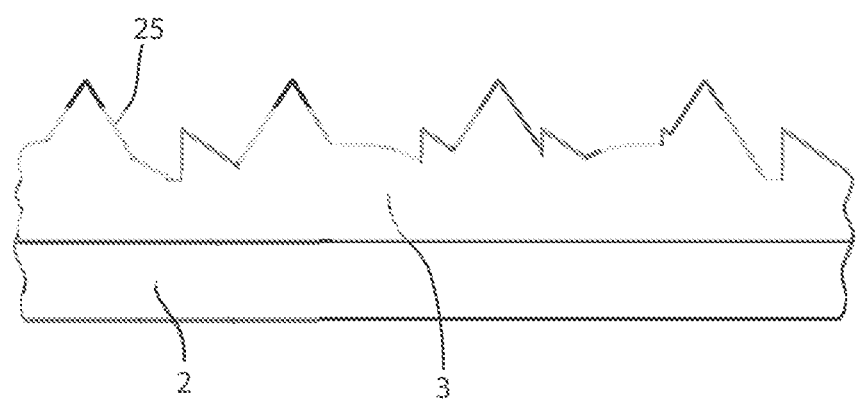
FIG. 9 shows a top view of another alternatively embodiment of a seal according to embodiments of the invention.

Further embodiments of the invention are shown in FIG. 4 where a seal 1 consisting of a seal body 2 and a seal part 3 exhibit a sinusoidal lubricant-guiding edge profile 9. The sinusoidal edge profile also enables a lubricant guiding functionality in both rotational directions. In this case, the lubricant is guided by the forward direction side of the sinusoidal wave form. An embodiment is further shown in FIG. 9 in which the periodically repeated pattern is a superposition of the patterns shown in FIGS. 2, 3 and 4. In particular, a seal body 2 and seal part 3 exhibiting a superposition edge profile 25 is shown.

Figure 5:
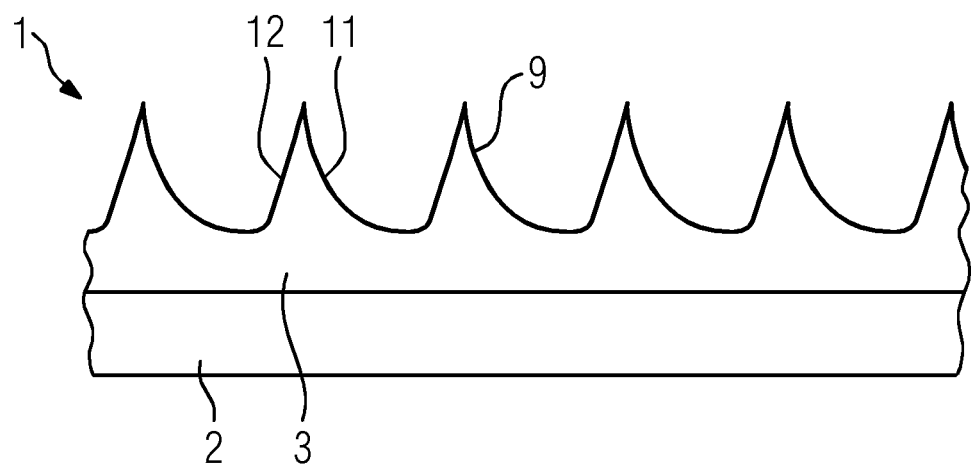
FIG. 5 shows a top view of another alternative embodiment of a seal according to embodiments of the invention.

Further embodiments with a superposition of triangular and sinusoidal patterns is shown in FIG. 5. The pattern obtained from the superposition exhibits periodically repeated geometric shapes, which form edges dedicated as edges in forward direction 11 which are differently than the edges in backward direction 12. As depending on the superimposed patterns, a wide variety of lubricant guiding edge profiles can be obtained for lubricant guidance in both one direction and two directions by superposition. In all depicted embodiments, the lubricant-guiding edge profile 9 of the seal part 3 is protruding the seal body 2 in such way that the entire lubricant guiding edge profile 9 is not covered by the seal body 2.

Figure 6:
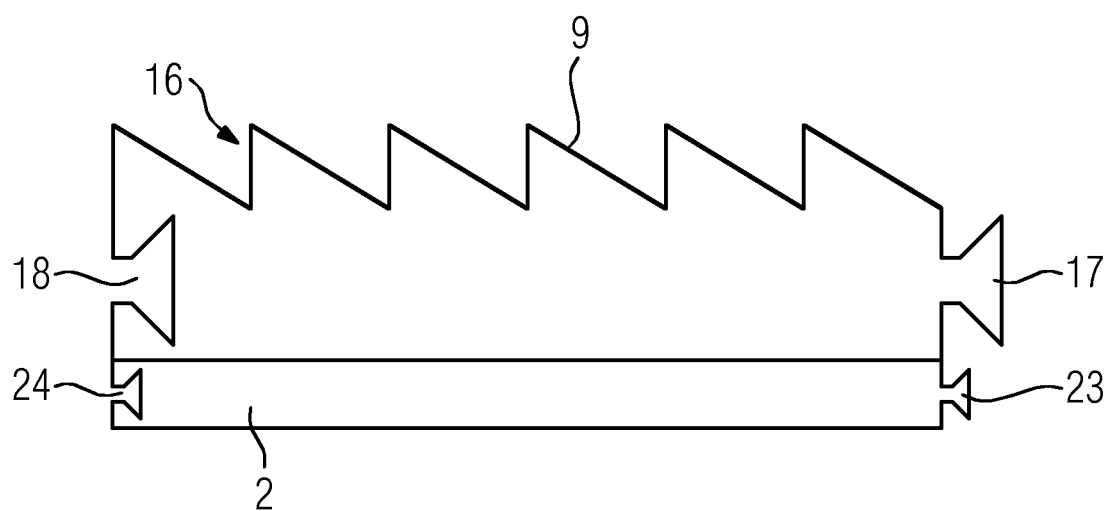
FIG. 6 shows a cut side view of an embodiment of a seal according to embodiments of the invention.
Figure 7:
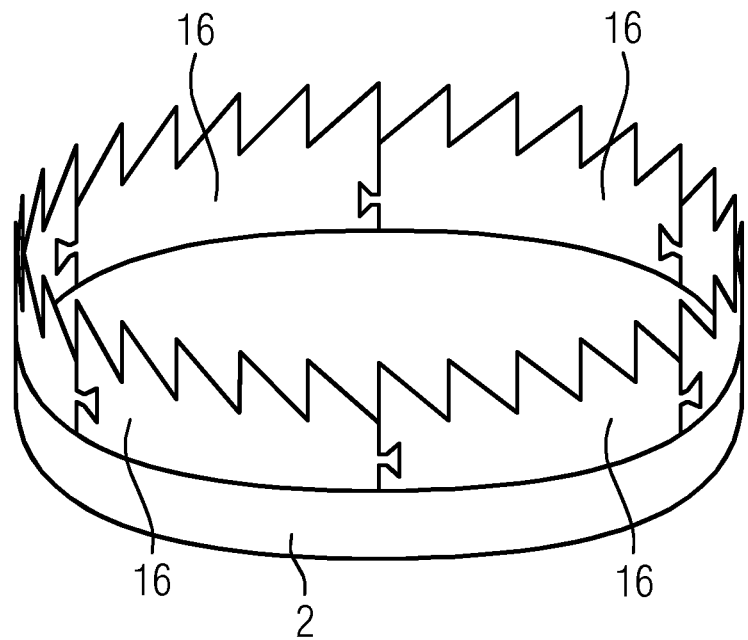
FIG. 7 shows a perspective view of a seal according to embodiments of the invention.

In FIG. 6, a seal part segment 16 is shown exhibiting a flute 17 and a notch 18 as counterpart for a dovetail joint. Also, the segmented seal body 2 exhibits a flute 23 and a notch 24 for establishing a positive connection. The seal part of a seal can be one-piece, so that the ring structure is obtained by connecting the flute 17 to the notch 18 of the same seal part segment. Alternatively, two or more seal part segments 16 can be connected to each other to form a ring like it is depicted in FIG. 7. Thereby, the lubricant-guiding edge profile 9 of each seal part segment is formed in such way, that the connected seal part segments exhibit in total an edge profile with a constant periodicity. In FIG. 7, the seal body 2 is one-piece and has been attached, for instance by gluing, to the connected seal part segments 16.

Figure 8:
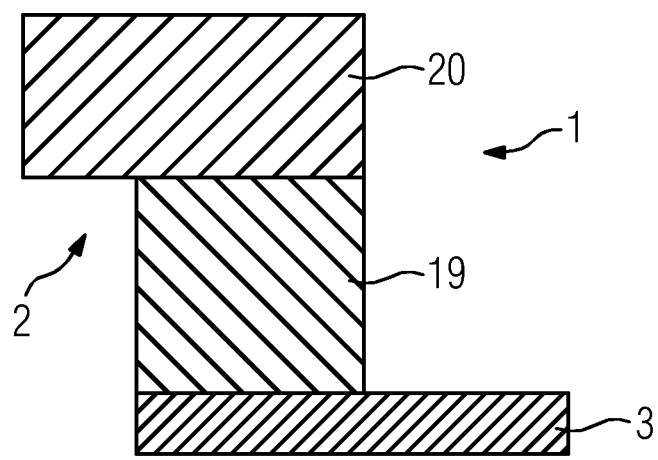
FIG. 8 shows a top view of a seal segment according to embodiments of the invention.

A sectional view of an unmounted seal 1 is depicted in FIG. 8. The seal part 3 made of PTFE is glued to the seal body 2 made for instance of cellular rubber and can be one piece or consists of separate parts which are for instance glued together or otherwise permanently fixed. The upper part 20 of the seal body can protrude the lower part 19 on either side and the range of the protrudance is between 2.5 mm and 7.5 mm. The seal 1 is mounted in the bearing by compression of the upper part 20 between for instance the outer ring 4 and the plate 7 like it is shown in FIG. 1. Due to this compression, the relative movement between the outer ring 4 and the seal 1 is prevented and the seal 1 is fixed in its mounted state.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A seal for a bearing arrangement for sealing an interior space between at least two parts of the bearing arrangement rotatable relatively to each other, in which the interior space contains a lubricant, wherein the seal comprises a seal part and a seal body connected to the seal part, wherein the seal part includes a surface that is flush with at least one of the at least two parts, and wherein the seal part further includes an edge that protrudes from the seal body a varying axial distance such that the shape of the edge conveys the lubricant with a direction component pointing into the interior space.

2. The seal according to claim 1, wherein the edge comprises a lubricant-guiding edge profile, which is a periodically repeated pattern extending at varying distances across the lubricant-guiding edge profile.

3. The seal according to claim 2, wherein the periodically repeated pattern is one of a saw-tooth profile, a pattern consisting of spaced triangles, a sinusoidal profile, and a superposition thereof.

4. The seal according to claim 1, wherein the seal part consists of two or more segments which are connectable to each other.

5. The seal according to claim 1, wherein the seal body is glued to the seal part.

6. The seal according to claim 1, wherein the seal body consists of a material that is elastic and compressible.

7. The seal according to claim 6, wherein the seal body consists of one of rubber, cellular rubber, and foamed polymer.

8. The seal according to claim 1, wherein the seal part consists of a polymer material.

9. The seal according to claim 8, wherein the seal part consists of PTFE.

10. A wind turbine comprising at least one rotor and at least one stationary structure, in which the rotor and the stationary structure are connected by a bearing, wherein the bearing comprises a seal according to claim 1.

\* \* \* \* \*